United States Patent [19]
Brinkley et al.

[11] Patent Number: 5,963,919
[45] Date of Patent: Oct. 5, 1999

[54] INVENTORY MANAGEMENT STRATEGY EVALUATION SYSTEM AND METHOD

[75] Inventors: Paul Andrew Brinkley, Morrisville, N.C.; Thomas Lindsay Dorval, Foxboro, Canada; Theresa McMahon Zwierzynski, Cary; George J. Gerenser, deceased, late of Raleigh, both of N.C., by Mary Ann Gerenser, executrix

[73] Assignee: Northern Telecom Limited, Canada

[21] Appl. No.: 08/771,684

[22] Filed: Dec. 23, 1996

[51] Int. Cl.⁶ .................................................. G06F 153/00
[52] U.S. Cl. .................................. 705/28; 705/29; 705/8; 705/22
[58] Field of Search ................................ 705/28, 22, 10, 705/8, 27; 364/479.06, 468.05; 235/385

[56] References Cited

U.S. PATENT DOCUMENTS

| | | | |
|---|---|---|---|
| 5,128,861 | 7/1992 | Kagami et al. | 705/10 |
| 5,237,496 | 8/1993 | Kagami et al. | 705/10 |
| 5,404,291 | 4/1995 | Kerr et al. | 705/5 |
| 5,446,890 | 8/1995 | Renslo et al. | 707/104 |
| 5,459,656 | 10/1995 | Fields et al. | 705/7 |
| 5,608,621 | 3/1997 | Caveney et al. | 705/10 |
| 5,611,051 | 3/1997 | Pirelli | 705/10 |
| 5,615,109 | 3/1997 | Eder | 705/8 |
| 5,712,985 | 1/1998 | Lee et al. | 705/7 |
| 5,712,989 | 1/1998 | Johnson et al. | 705/28 |
| 5,765,143 | 6/1998 | Sheldon et al. | 705/28 |
| 5,819,232 | 10/1998 | Shipman | 705/8 |

*Primary Examiner*—James P. Trammell
*Assistant Examiner*—Demetra R. Smith
*Attorney, Agent, or Firm*—Finnegan, Henderson, Farabow, Garrett & Dunner, L.L.P.

[57] ABSTRACT

A system and method for evaluating an inventory management strategy combines multiple management strategies in a single inventory management system. The system analyzes the inventory portfolio on an item-by-item basis to assign the most suitable management strategy for that item. The inventory management system provides a high level of flexibility for the users to define input parameters to ensure a desired level of customer satisfaction. Additionally, it determines whether the inventory items are forecastable before predicting future demands.

44 Claims, 12 Drawing Sheets

INPUT TABLE 400

| COLUMN | DESCRIPTION | FIELD FORMAT |
|---|---|---|
| A | LINE ITEM INDEX NUMBER | INTERGER |
| B | CORPORATE PRODUCT CODE (CPC) | STRING |
| C | PRODUCT ENGINEERING CODE (PEC) | STRING |
| D | DESCRIPTION | STRING |
| E | PLANNER CODE | STRING |
| F | BUYER CODE | STRING |
| G | DEPARTMENT CODE | STRING |
| H | PRODUCT FAMILY | STRING |
| I | NUMBER OF ORDERS PLACED | INTEGER |
| J | AVERAGE CUSTOMER REQUIREMENT INTERVAL (CRI) | FLOATING POINT |
| K | STD. DEVIATION OF CUSTOMER REQUIREMENT INTERVAL (IN DAYS) | FLOATING POINT |
| L | SETUP COST | INTEGER |
| M | HOLDING COST PERCENTAGE | FLOATING POINT |
| N | AVERAGE LEAD TIME | FLOATING POINT |
| O | STD.DEVIATION OF LEAD TIME (IN DAYS) | FLOATING POINT |
| P | PURCHASED OR MANUFACTURED | 0 IF PURCHASED, 1 IF MANUFACTURED |
| Q | UNIT COST | FLOATING POINT |
| R | TOTAL DEMAND FOR PERIODS 1-k | FLOATING POINT |
| S-Z, AA-Br | WEEKLY PERIOD DEMANDS (FOR 52 WEEKS) | FLOATING POINT |

*FIG. 4*

MISER INPUT PARAMETERS

MISER

- ○ USE MANUFACTURING LEAD TIME DATA FROM FILE.
- ◉ SET GLOBAL VALUES FROM MANUFACTURING LEAD TIME.
  - ◉ USE AVERAGE DAYS OF MANUFACTURING LEAD TIME FROM FILE.
  - ○ SET AVERAGE DAYS OF MANUFACTURING LEAD TIME GLOBALLY TO: [10]
  - ◉ USE STANDARD DEVIATION OF MANUFACTURING LEAD TIME FROM FILE.
  - ○ SET PERCENT VARIATION OF MANUFACTURING LEAD TIME TO: [5.4] %

- ○ USE PURCHASING LEAD TIME DATA FROM FILE.
- ◉ SET GLOBALLY VALUES FOR PURCHASING LEAD TIME.
  - ◉ USE AVERAGE DAYS OF PURCHASING LEAD TIME FROM FILE.
  - ○ SET AVERAGE DAYS OF PURCHASING LEAD TIME GLOBALLY TO: $ [10]
  - ◉ USE STANDARD DEVIATION OF PURCHASING LEAD TIME FROM FILE.
  - ○ SET PERCENT VARIATION OF PURCHASING LEAD TIME TO: [5.4] %

| MISER CHECK INPUT | | |
|---|---|---|
| FILENAMES: | | |
| INPUT FILE: H:\PROJECTS\MISER\NEW\WIN\RELEN | | |
| OUTPUT FILE: MISER.OUT | | |
| | | |
| WEEKS OF HISTORICAL DATA USED: 52 | CUSTOMER REQUIRED INTERVAL: | |
| DESIRED CUSTOMER SELLS FACTION LEVEL: 95% | AVERAGE DAYS: | FROM FILE |
| | STANDARD DEVIATION: | FROM FILE |
| HOLDING COST PERCENTAGE: FROM FILE | MANUFACTURED ITEM LEAD TIME: | |
| SETUP COSTS | AVERAGE DAYS: | FROM FILE |
| MANUFACTURED ITEMS: FROM FILE | STANDARD DEVIATION: | FROM FILE |
| PURCHASED ITEMS: FROM FILE | PURCHASED ITEM LEAD TIME: | |
| | AVERAGE DAYS: | FROM FILE |
| | STANDARD DEVIATION: | FROM FILE |
| CHANGE VALUES | CONTINUE | |

*FIG. 5d*

OUTPUT TABLE 600

| COLUMN | DESCRIPTION | FIELD FORMAT |
| --- | --- | --- |
| A | LINE ITEM INDEX NUMBER | INTEGER |
| B | CPC CODE | STRING |
| C | PEC CODE | STRING |
| D | DESCRIPTION | STRING |
| E | PLANNER CODE | STRING |
| F | BUYER CODE | STRING |
| G | DEPARTMENT CODE | STRING |
| H | PRODUCT FAMILY | STRING |
| I | STRATEGY | INTEGER |
| J | UNIT COST | FLOATING POINT |
| K | COST OF SALES | FLOATING POINT |
| L | VOLUME | FLOATING POINT |
| M | ORDERS | INTEGER |
| N | REORDER POINT | LONG INTEGER |
| O | EOQ | LONG INTEGER |
| P | SAFETY STOCK | LONG INTEGER |
| Q | KANBAN | LONG INTEGER |
| R | INITIAL INVENTORY | LONG INTEGER |
| S | AVERAGE INVENTORY | FLOATING POINT |
| T | INITIAL COST | FLOATING POINT |
| U | AVERAGE COST | FLOATING POINT |
| V | SETUP COST | FLOATING POINT |
| W | MEAN CRI | FLOATING POINT |
| X | STD. DEVIATION (%) | FLOATING POINT |
| Y | MEAN LEAD TIME | FLOATING POINT |
| Z | STD. DEVIATION (%) | FLOATING POINT |
| AA | FORECAST | FLOATING POINT |
| AB | INVENTORY TURNS | FLOATING POINT |

*FIG. 6*

INVENTORY MANAGEMENT STRATEGY EVALUATION SYSTEM AND METHOD

BACKGROUND OF THE INVENTION

The present invention relates generally to inventory management, and more particularly, using such system to optimize inventory management with multiple management strategies.

A reliable inventory management system is important for any business involved with sale of goods or services. To manage inventory resources properly, businesses must accurately keep track of inventory count, maintain a sufficient amount of inventory on stock, and timely re-stock an appropriate amount of inventory. It is extremely difficult to maintain just enough inventory on stock that sustains a sufficient amount of stock to satisfactorily fulfill customers' orders without over-stocking. A delicate balance is necessary to avoid over-stocking, which poses many risks such as tying up funds and incurring maintenance costs, including storage space expense, spoilage and damage, and depreciation of inventory value. Maximizing the efficiency of the inventory management is extremely critical and can play a major role in the success of a company. See, Gary McWilliams, Double Barrels Aimed At Dell, *Business Week* 6 (Dec. 9, 1996).

In addition to maintaining a proper level of inventory on stock, timeliness of restocking is critical in planning for future orders. Many factors influence the timing of orders. For example, specially manufactured items or seasonal goods may require advance notices. Also important is the availability of alternate suppliers and substitutability of goods.

There is a wide array of inventory management strategies available, for example, make-to-order, Kanban, and fixed-rate supply. A detailed description of the Kanban method is provided in Monden & Yasuhiro, *Toyota Production System* (2d ed. 1993). These inventory management strategies implement different re-order points and replenishment quantity. For example, under the make-to-order strategy, there is no stock in a warehouse and products are manufactured whenever a customer places an order. On the other hand, under the Kanban strategy, a small stock is maintained in the warehouse and inventory is replenished as it is depleted.

Many businesses today use automated software tools to facilitate inventory management. Automated systems apply a single strategy to the entire portfolio of products offered to customers. Single strategy inventory management systems, however, have many disadvantages. First, applying a single strategy to the entire inventory portfolio fails to take into account the differing needs and importance of various types of goods. For example, some goods may require a large quantity of inventory stock in the warehouse while other goods may be manufactured or replenished only when customers order the goods.

Second, single strategy systems do not allocate resources and risks according to the type of goods, needs, and importance. For instance, even if an inventory item runs out, it may not pose a great deal of problem for the business if the inventory can be easily replaced in a relatively short period of time. However, if a specific inventory requires a significant lead time or can only be manufactured by a limited number of sources, inventory mismanagement of that inventory item poses a greater risk. Accordingly, inventory management systems should be designed to accommodate specific characteristics and requirements of various types of inventories.

Currently, there appears to be no system implementing multiple management strategies. Such a system, however, would enable a business to tailor the management system according to its needs and inventory portfolio. Specifically, the system would allow businesses to tailor the inventory system to accommodate the management of the portfolio on a product-by-product basis based upon factors such as number of orders, lead times, weekly volumes, and other factors related to processing orders and maintaining inventory.

Forecasting future demand is another key factor in properly managing the inventory portfolio. Studies on general forecasting techniques discuss how to mathematically forecast a particular set of historical data. There are also commercially available statistical forecasting software packages to estimate future demand. Studies, however, have not examined identifying decision criteria that dictate whether an item or process is "forecastable." Existing inventory management systems predict future demand of all items in an inventory portfolio regardless of the type of item or amount of historical data available for a particular item. Such systems, however, lead to large forecast errors and significantly reduce the ability to manage the inventory with accuracy.

Therefore, it is desirable to provide an inventory management system that accommodates special characteristics and requirements of various types of inventory portfolios.

In addition, it is desirable to combine multiple management strategies in a single inventory management system to provide an accurate and optimal inventory management tool.

It is further desirable determine whether an inventory item is forecastable.

SUMMARY OF THE INVENTION

Systems and methods consistent with the present invention automatically evaluate the inventory portfolio, select an appropriate group of inventory strategies, and provide information to implement each of the inventory strategy.

Specifically, a system for providing an inventory management system consistent with this invention comprises accessing means, analyzing means, and selecting means. Accessing means accesses inventory resources data corresponding to the inventory portfolio and an inventory item to be evaluated. Analyzing means then analyzes the inventory resources data of the inventory item with the inventory resources data of the inventory portfolio. Finally, selecting means selects an appropriate one of the inventory management strategies for the inventory item based on the result of the analysis.

A method for providing an inventory management system consistent with this invention comprises several steps. Initially, a data processor accesses inventory resources data corresponding to the inventory portfolio and an inventory item to be evaluated. It then analyzes the inventory resources data of the inventory item with the inventory resources data of the inventory portfolio. Finally, the data processor selects an appropriate one of the inventory management strategies for the inventory item based on the result of the analysis.

BRIEF DESCRIPTION OF THE DRAWINGS

The accompanying drawings, which are incorporated in and constitute a part of this specification, illustrate the invention and together with the description, serve to explain the principles of the invention.

In the drawings,

FIG. 4 is a table illustrating the input format of an inventory item;

FIGS. 5a–5d are sample input screen displays for specifying input parameters;

FIG. 6 is a table illustrating the output format of inventory strategy for an inventory item;

DESCRIPTION OF THE PREFERRED EMBODIMENT

Reference will now be made in detail to the present preferred embodiment of the invention, an example of which is illustrated in the accompanying drawings.

Figure 1:
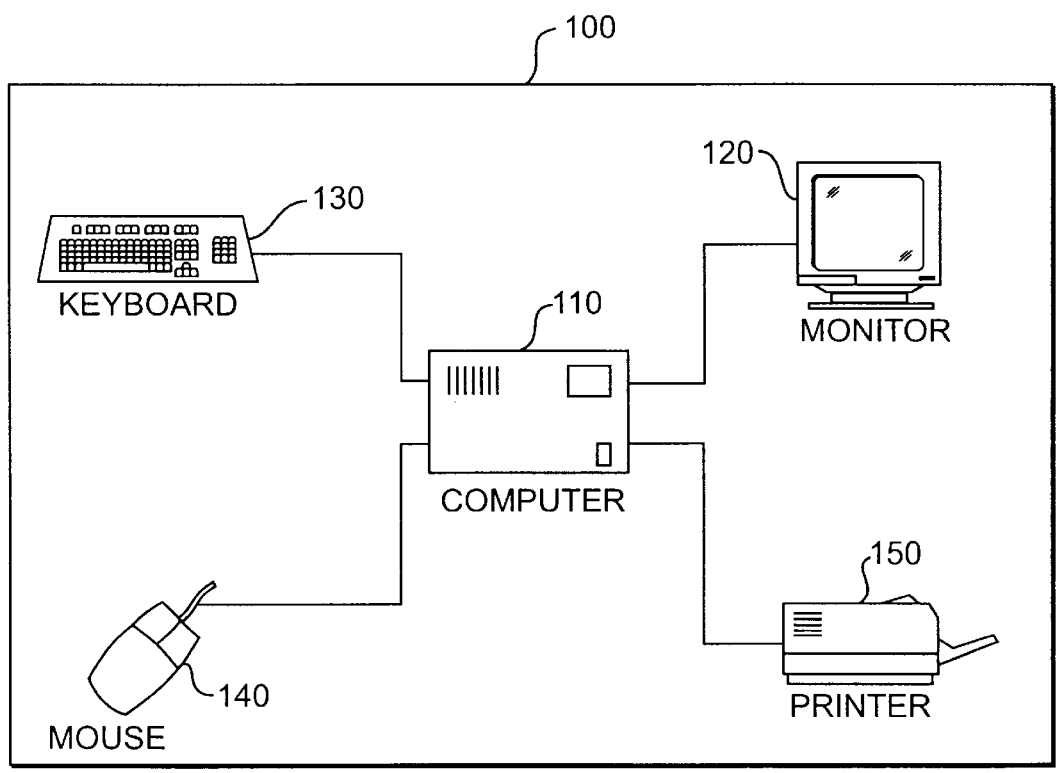
FIG. 1 is a diagram of an inventory management system consistent with the present invention.

FIG. 1 shows an inventory management system 100 consistent with the present invention. System 100 includes a computer 110 connected to a monitor 120, a keyboard 130, a mouse 140, and a printer 150. In the preferred embodiment, computer 110 is either an IBM-compatible personal computer with a 386 processor or higher, or a Macintosh with a 68030 processor or better.

Figure 2:
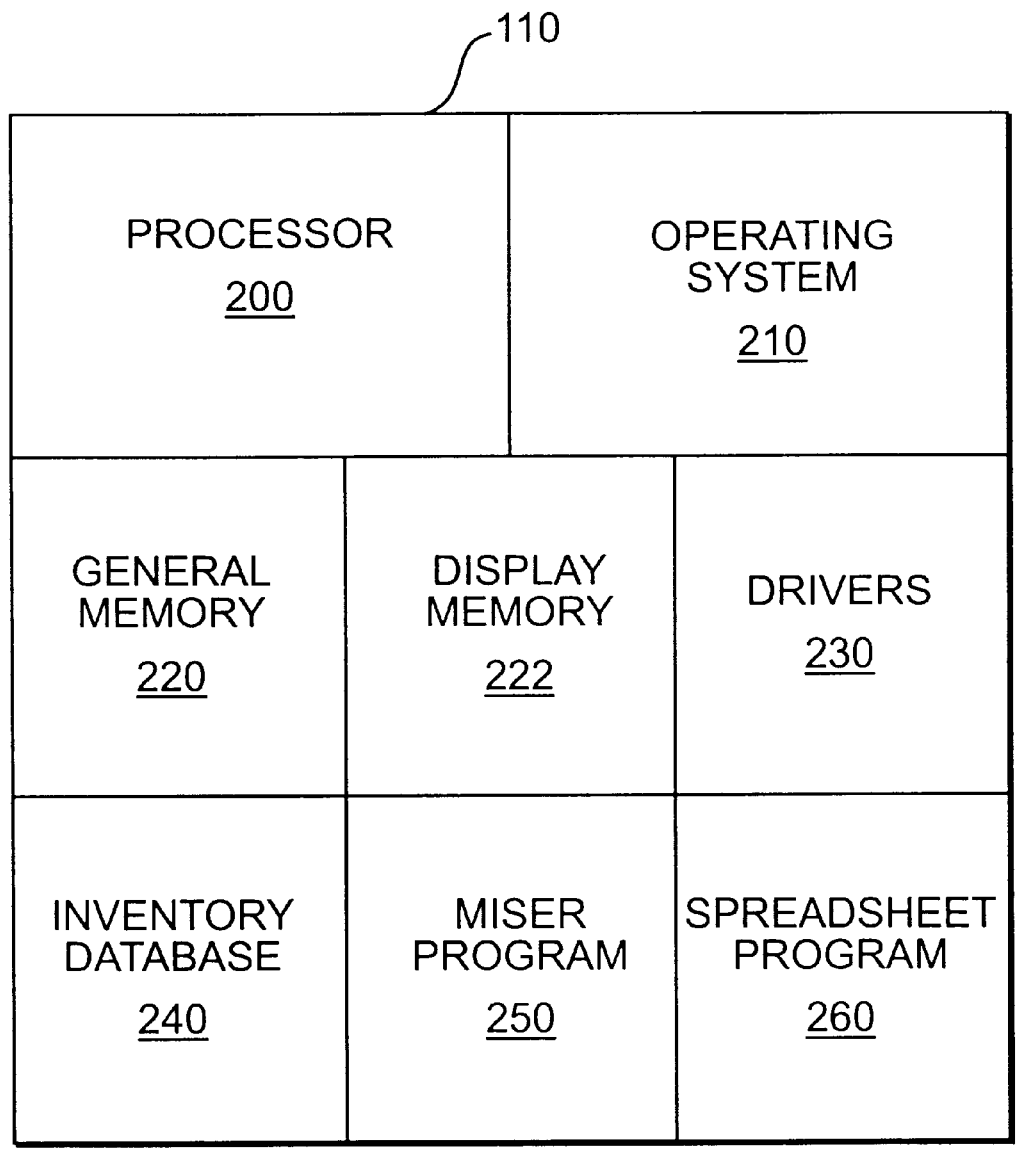
FIG. 2 is a schematic diagram illustrating in detail components of a computer in FIG. 1.

FIG. 2 shows a schematic diagram illustrating components of computer 110. A processor 200 is preferably a 386 processor or higher. An operating system 210 is preferably Windows 3.1 or higher. Computer 110 has 8 MB RAM composed of a general memory 220 and a display memory 222. Drivers 230 control various input and output devices connected to computer 110. Computer 110 also contains an inventory database 240, which will be explained below. Additionally, a MISER (Merchandise Inventory Strategy Evaluation Rules) program 250 controls the overall process of system 100. MISER program 250 is preferably written in Microsoft Visual C++ for Windows, Version 4, along with Macintosh Cross-Development Tools add-on package. MISER program 250 currently requires only about 2.5 MB of hard disk space. Spreadsheet program 260 may be one of any commercially available software package such as Microsoft Excel or Lotus 123.

Unlike previous systems that applied a single inventory management strategy for the entire inventory portfolio, system 100 offers an efficient and flexible way of managing inventories. System 100 evaluates the inventory portfolio and selects an appropriate management strategy for each inventory item. Thus, system 100 is a single management system capable of implementing multiple inventory management strategies to best suit a particular inventory portfolio.

To provide an inventory management system that automatically adjusts to the particular characteristics of the inventory portfolio, system 100 simulates an inventory manager's manual decision process. Specifically, MISER program 250 executes a process that inventory managers ideally use in deciding how to stock various items within a given inventory portfolio. Such decision process involves considering several factors, including historical trends, unit cost, setup costs, lead times (both procurement and delivery), desired customer delivery assurances levels, and risks. While no inventory model can accommodate every conceivable variable, systems consistent with the present invention focus on a far easily quantifiable measures on which to base the decision process. By running MISER program 250, system 100 identifies the appropriate inventory strategy for each item and provides information about how the strategy should be implemented.

Currently, there is a wide array of inventory replenishment strategies applied in the business world today. Typical strategies include materials requirements planning (MRP), manufacturing resources planning (MRP-II), distribution requirements planning (DRP), just-in-time production (JIT), Kanban, supplier-managed inventory, consignment, statistical inventory control, and time-phased reorder point. These strategies are well known to those skilled in the art and thus will not be described in detail.

Unfortunately, these techniques sometimes overlap and different people disagree on their implementation. Systems consistent with the present invention, however, provide six inventory strategies that eliminate typical jargon in favor of more descriptive terminology and concepts: make-to-order, replenish-to-order, warehouse replenishment, fixed-rate supply, multi-input expert planning, and forecast optimal. Each of these strategies will be explained in detail below. This group of six strategies adequately covers all reasonable inventory stocking scenarios. Additionally, for each of the six inventory strategies, system 100 addresses four basic questions in developing an inventory management policy—Who, When, How, and How much.

"Who" identifies the entity responsible for initializing replenishment of a particular inventory item. To determine the appropriate entity, relevant factors include the location in the supply chain at which the order (to manufacture or purchase) is placed, and the type of information necessary to place the order effectively. For example, replenishment of certain items can be accomplished using electronic data interchange (EDI) by having a warehouse worker scan a bar code on a card when an item is depleted, automatically triggering an order to the source of replenishment. At the other extreme, replenishment decision requires the oversight of a master scheduler/planner, using information such as forecast demand, inventory balance-on-hand (BOH) available at various locations, and projected plant capacity.

"When" identifies the timing of replenishing the stock. Typically, a replenishment order is triggered whenever the inventory level falls below a fixed reorder point (ROP), which is calculated by considering an estimated mean and variation in lead time as well as predicted demand levels. Other options include replenishment to forecast, or replenishment to order. The latter refers to a Kanban-style policy of keeping a set amount of stock in inventory, then replenishing to maintain that amount whenever a customer order is received, regardless of the order size. A variation in this policy is a straight make-to-order strategy, where no inventory is maintained, and products are only manufactured or purchased upon customer demand.

"How" identifies the mechanics of the replenishment process. Three methods of inventory review are available: Periodic, Per-Use, and Continuous. In a periodic system, inventory levels are monitored through cycle counting. If the inventory level for an item falls below a reorder point, an order is placed. The per-use system assesses the inventory level every time an item is picked, and triggers replenishment accordingly. Continuous review system is typically automated, which records each addition and substraction of an inventory level via an on-line information system, including corrections found during cycle-counting activities. The information system automatically monitors inventory balances, and generates a replenishment order or sends a replenishment trigger message to the appropriate function.

Finally, "How Much" identifies the order quantity once a decision to replenish has been made. Some choices include an economic order quantity (EOQ), calculated based on ordering an to minimize total inventory management expenditure, and lot-for-lot replenishment, i.e., ordering as much as necessary to return inventory to a desired level after depletion.

The following is a description of each of the six strategies including information addressing the four factors discussed above. It also lists primary characteristics of inventory items suitable for the particular strategy and secondary data required for inventory management.

1. Make-To-Order—Appropriate for rare demands that occur randomly. No stock is held the in warehouse and orders are manufactured as needed.

a. Four Factors
   i. Who: Customer Order Entry generates replenishment order directly, e.g., sales
   ii. When: Upon placement of a customer order for the product
   iii. How: Triggered by customer order input
   iv. How Much: Lot-for-lot
b. Primary Characteristics
   Product lead time falls within the customer requirement interval, such that it can be supplied directly from manufacturing (or outside supplier) in time to meet customer demand without requiring stock.
   High cost-per-order items
   Demand is rare and random, and highly variable
   Demand trend is not increasing
   Cost is high relative to volume
c. Secondary Data Required for Management
   Risk of obsolescence
   Setup cost
   Convertibility - can be made from, or made into, another finished good (configurability)

2. Replenish-To-Order (Kanban)—Optimal strategy with rare demand items. Customer order interval is sometimes shorter than the supply lead time. There is a small stock in the warehouse, which is replenished as it is depleted by customer order.

a. Four Factors
   i. Who: Warehouse generates replenishment order
   ii. When: Upon fulfillment of a customer order from stock
   iii. How: Per-use review; triggered by picking activity
   iv. How Much: Lot-for-lot
b. Primary Characteristics
   Product lead time at least occasionally does not fall within the customer requirement interval
   High cost items
   Demand is rare and random, and highly variable
   Demand trend is not increasing
   Cost is high relative to volume
   "Other" demand insufficient to cover usage ("other" demand such as MRP dependent demand for an item that is used both as a sub-assembly and sold as a finished good or spare part)
c. Secondary Data Required for Management
   Risk of obsolescence
   Setup cost
   Convertibility - can be made from, or made into, another finished good (configurability)
   Quantity discounts (if purchased)
   Holding cost (size, weight, fragility, shelf life)
   Demand source
   Desired customer service level
   Cost to expedite 3. Warehouse Replenishment (EOQ)—Strategy appropriate for items that are replenished based on make-to-stock reorder point (ROP). There is a cost-optimized level of stock held in the warehouse, replenished at ROP.

a. Four Factors
   i. Who: Warehouse generates replenishment order
   ii. When: Whenever inventory level falls below reorder point
   iii. How: Per usage or continuous review
   iv. How Much: Economic Order Quantity
b. Primary Characteristics
   Product lead time does not fall within the customer requirements
   Cost low relative to volume, and below some absolute value
   Demand and lead time is relatively stable
   Relatively forecastable
c. Secondary Data Required for Management
   Seasonality and trend
   Risk of obsolescence
   Setup cost
   Convertibility - can be made from, or made into, another finished good (configurability)
   Quantity discounts (if purchased)
   Holding cost (size, weight, fragility, shelf life)
   Demand source
   Desired customer service level
   Engineering change frequency
   Stockout cost
   Planned sales promotions
   Forecast (especially if demand is high or variable, and/or forecast quality is good, and lead time is not variable)

4. Fixed-Rate Supply—Strategy that works well with high volume, stable demand, commodity item. Continuous production allocated as product comes off manufacturing line.

a. Four Factors
   i. Who: Manufacturing sets fixed-rate production based on near-zero variability future demand
   ii. When: Continuous production, lead-time essentially zero
   iii. How: Customer orders filled as product comes off the line
   iv. How Much: Fixed rate
b. Primary Characteristics
   High-volume, low-cost
   Very low demand variability
   Product lead time falls within the customer requirement interval, such that it can be supplied directly from manufacturing in time to meet customer demand without holding stock. Typically, a product that is produced continuously and allocated to the customer order as it rolls off the line.
c. Secondary Data Required for Management
   Demand trend
   Freight cost
   Control of capacity (manufactured in-house or under capacity contract with supplier)

5. Multi-Input Expert Planning—Strategy optimal where cost, trend, or variability of item demand justifies expert planning. While EOQ, and often forecast, implementation details are provided, user is strongly encouraged to look more closely at these items before assigning any inventory strategy due to the high risk factors involved.

a. Four factors
   i. Who: Expert master planner (or expert system) with Marketing and Operations visibility
   ii. When: Using heuristics based on forecast, BOH, planned customer orders, and capacity
   iii. How: Periodic or continuous review
   iv. How Much: Decision driven by planner, based on best estimates of forecast, EOQ, marketing input
b. Primary Characteristics
   High cost and high volume
   Cost high relative to volume
   Demand is extremely variable
   Lead time is extremely variable
c. Secondary Data Required for Management
   Inventory on hand in warehouses
   Capacity
   Planned customer orders
   Setup cost
   Quantity discounts
   Holding costs (size, weight, fragility, shelf life)
   Convertibility - can be made from, or made into, another finished good (configurability)
   Demand source
   Engineering change frequency
   Stockout cost or customer service level
   Sales promotions
   Forecast (or demand history)

Figure 3:
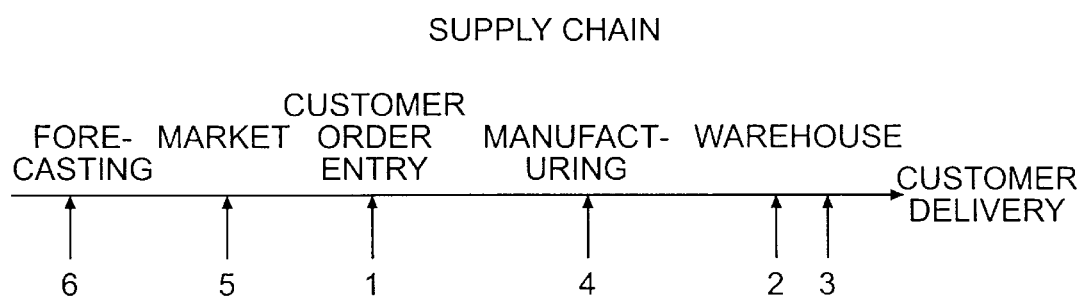
FIG. 3 is a graphical representation the inventory replenishment points with respect to the customer order points.

6. Forecast Optimal—Optimal strategy for items having a demand history with patterns supporting statistical forecasting.

a. Four Factors
   i. Who: Expert master planner with forecast input
   ii. When: Weekly input based upon MRP/MPS requirements
   iii. How: Periodic or continuous review
   iv. How Much: Decision based upon weekly forecast requirements and desired service level
b. Primary Characteristics
   Significant increasing or decreasing trend
   Significant seasonal or cyclic pattern
   Low "noise" other than trend or seasonality
   Low intermittence (weekly zero-demand occurrence)
c. Secondary Data Required for Management
   Inventory on hand in warehouses
   Capacity
   Planned customer orders
   New product introduction
   Planned obsolescence
   Holding costs (size, weight, fragility, shelf life)
   Convertibility - can be made from, or made into, another finished good (configurability)
   Demand source
   Engineering change frequency
   Stockout cost or customer service level
   Sales promotions FIG. 3 is a graphical representation of where each of the above six strategy falls on the supply chain in terms of how close to the actual customer order the inventory replenishment order takes place. For example, for strategy #1 (Make-To-Order), replenishment point coincides with the customer order entry point. Replenishment points for strategy #2 (Replenish-To-Order) and #3 (Warehouse Replenishment) are based on the level of stock held in the warehouse.

To initiate MISER program 250 in the preferred implementation, a user double-clicks on the program icon and selects an inventory portfolio to be evaluated. Inventory portfolios are generally stored in inventory database 240 as a separate input file using spreadsheet program 260. To convert the spreadsheet file into a "tab-delimited" text file for use in MISER program 250, a user simply selects an option in spreadsheet program 260 to "Save As" a text tab-delimited file. This converts the spreadsheet file into a universally-readable plain text format. Thus, input file is now a "tab-delimited" text file containing essentially a large table holding all the information about a specific portfolio, one item per line.

FIG. 4 is a sample table illustrating the input format of an inventory item. The format and content of input table 400 are exemplary only and may be easily modified. For illustration purposes, a column of an input line, representing a field of an inventory item, is shown as a row in an input table 400. For example, column A of the input line contains a line item index number field in an integer format. Other fields include the inventory item's description, number of order, customer requirement interval (CRI), standard deviation of CRI, setup cost, average lead time, unit cost, total demand, and weekly demand.

Figure 5A:
Figure 5B:

After the input file is properly formatted for MISER program 250, the user may specify input parameters about how the user wants to use the information in the input file. FIGS. 5a–5c are sample input screen displays for specifying input parameters. FIG. 5d is a sample input screen summarizing the input parameters. During this process, the user may override values contained in the input file with user-specified values. For example, as shown in FIG. 5a, MISER program 250 allows the user to specify the output file name, number of weeks of historical demand data, and desired customer assurance level. If the user inputs 95% for desired customer assurance level, MISER program 250 then assures that the level of stock carried, or currently in the pipeline, is sufficient to meet at least 95% of orders coming in based on past trends and future forecasts.

FIGS. 5b and 5c show other input fields that the user may define such as global setup cost values, customer required interval, manufacturing lead time, and purchasing lead time. After the user finishes defining input parameters, MISER program 250 presents a summary of the input parameters to the user as shown in FIG. 5d. The user at this point may change any of the displayed values or choose the "continue" icon to run MISER program 250.

If the user double-clicks on the "continue" icon, computer 110 runs MISER program 250 to create an output file. FIG. 6 is a sample table illustrating the output format of an inventory item. For illustration purposes, a column of an output line, representing a field of an inventory item, is shown as a row in an output table 600. Various fields include the selected strategy for each item in the portfolio as well as information necessary to implement the strategy.

Figure 7:
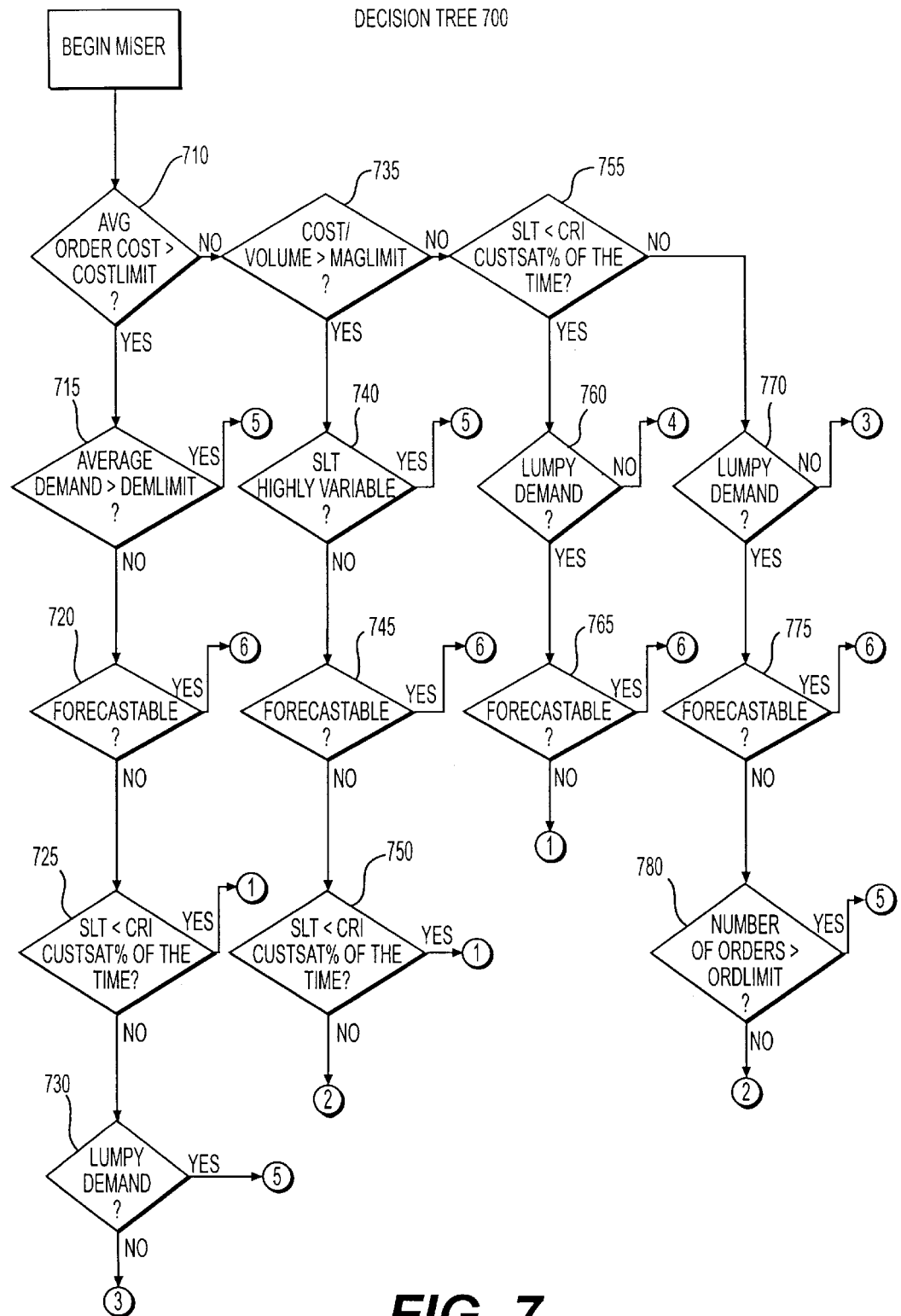
FIG. 7 is a decision tree illustrating a preferred evaluation process for selecting the appropriate inventory strategy.

In evaluating the portfolio to select the appropriate strategy, MISER program 250 uses a decision tree 700 illustrated in FIG. 7. Before proceeding through the decision tree, however, MISER program 250 stratifies the portfolio. The goal of stratification is to identify the cutoff values used in various nodes of the decision tree. Thus, after the cutoff values are determined, each inventory item can be individually evaluated using the decision tree by comparing the various input parameters of the item to the cutoff values. Then, an appropriate inventory strategy is assigned based on whether the item meets the cutoff threshold at certain critical nodes of the decision tree.

By doing so, MISER program 250 identifies, for example, items which are rare or contribute only slightly to the total portfolio. Stratification techniques are well known in the production/inventory management field and will not be described in detail here. Details on stratification techniques, such as ABC stratification, are provided in Benito E. Fores & D. Clay Whybark, Implementing Multiple Criteria ABC Analysis, *APICS Journal of Operations Management* 79–85 (1992).

Specifically, MISER program 250 stratifies the portfolio based on three criteria: order cost, volume of orders, and number of orders. For each criteria, stratification process produces three threshold values, costlimit, demlimit, and ordlimit, respectively. To do so, MISER program 250 sorts the portfolio items according to each of the three criteria, then for each criteria, MISER program 250 determines a specific cutoff value based on pre-defined or user-specified input parameters.

The first stratification criteria, cost per order, identifies items that are "high risk" on an order-by-order basis. For example, MISER program 250 identifies items that represent, for example, the top 5% of the portfolio. Such items expose a business to a high risk of loss if an order is incorrectly placed, thereby either sacrificing a large amount of revenue, or necessitating a large amount of dollar-volume in a warehouse. MISER program 250 assigns the numerical value representing the top 5% of the order cost to variable costlimit.

Next, total volume stratification identifies a class of items whose volume falls within, for example, the top 20% of the portfolio. For example, if a portfolio contains ten items and the volume sold for each of the ten items is 1, 2, 3, 4, 5, 6, 7, 8, 9, and 10, respectively, the total volume is fifty five and the last six items account for 82% of the total volume (45 out of 55). Then, according to the volume objective, which is either pre-defined or user-specified, items falling below the objective are isolated for a different strategy.

In the above example, if the volume objective is 80%, then the first four items, with volume of 1, 2, 3, and 4, respectively, fall below the cutoff line and are isolated for assignment to a different strategy. Likewise, if the cutoff volume limit is five, then any item with volume of five or greater would pass the test. Those items with fewer than five would fail the test and a different inventory strategy is assigned. MISER program 250 assigns the numerical value representing the volume limit is to variable demlimit.

Finally, order frequency stratification determines items having a high order frequency and therefore, a high correlation to customer services. If these items are misordered, it could result in a large number of unfilled orders or excessive volumes to be carried in stockrooms. MISER program 250 assigns the numerical value representing high order frequency to variable ordlimit.

As described in connection with specific management strategies, some inventory strategies require forecasting future demand. MISER program 250 implements a two-step process to provide a more accurate assessment of future demand. First, MISER program 250 analyzes each inventory item to determine whether the item is forecastable. Second, if an item is deemed forecastable, MISER program 250 forecasts the future demand of the inventory item. The two-step approach of system 100 forecasts inventory demand only under appropriate and optimal circumstances, and avoids forecast error of any great magnitude.

To determine whether the item is forecastable, MISER program 250 divides the items into three categories: forecast-inappropriate, forecast-appropriate, and forecast-optimal. During the initial screening, MISER program 250 analyzes whether an inventory item has an extremely low demand or order frequency with orders occurring in a totally random fashion. In other words, MISER program 250 determines whether there is sufficient amount of historical data and analyzes the coefficient of variation among the historical data to determine the level of fluctuation among the available data. If there is insufficient amount of historical data or if the historical data fluctuates beyond a desired level, MISER program 250 renders the item as forecast-inappropriate. If not, the item is forecast-appropriate.

In the next layer of the screening process, MISER program 250 ascertains which of the forecast-appropriate items are forecast-optimal. This screening process, which will be described in detail below, takes place within a decision tree 700 shown in FIG. 7. As will be explained below, if the item is classified as forecast-optimal, MISER program 250 assigns strategy #6 (Forecast Optimal) and predicts future demand based on historical data.

After obtaining the three cutoff values by stratifying, MISER program 250 proceeds with the evaluation process according to decision tree 700. MISER program 250 first checks whether "Average Order Cost>costlimit" (step 710). Average Order Cost of the inventory item is the total dollar sales for the total period surveyed divided by the total number of orders for the item during that period. As previously mentioned, costlimit is obtained by stratifying the portfolio by average order cost per line and represents a 95th percentile limit of average order cost. The decision criteria of step 710 identifies items that are high-risk in terms of total expenditure for a single order relative to the total product portfolio.

If Average Order Cost exceeds costlimit, then MISER program 250 determines whether "Average Demand>demlimit" (step 715). Average demand is obtained by dividing total demand by the number of periods for which the demand data is provided. As mentioned above, delimit is obtained by stratifying the portfolio by total volume per line item and represents a certain percentile of an entire product portfolio. The decision criteria of step 715 identifies highest volume line items in the portfolio. If Average Demand exceeds demlimit, MISER program 250 assigns inventory strategy #5 (Multi-Input Expert Planning) to the inventory item.

If Average Demand falls below demlimit, MISER program 250 checks whether the item is "forecastable," i.e., whether future demand of the item can be properly predicted based on historical demand data (step 720). Specifically, if the inventory item has fewer than 32 periods of zero-demand, MISER program 250 computes a coefficient of variation among the past demand data. If the coefficient of variation for the non-zero demand period is less than 1.0, the item is considered forecastable and MISER program 250 assigns strategy #6 (Forecast Optimal) to the inventory item.

Thereafter, MISER program 250 forecasts future demand of the item using a generally known forecasting technique such as the Croston methodology. Croston method is a modified version of a forecasting technique known as exponential smoothing used to accommodate intermittent demand. Exponential smoothing is defined in detail in D. D. Bedworth & J. E. Bailey, *Integrated Production Control Systems* (2d ed. 1987). If the item contains no more than one period of zero-demand, an autoregressive error variability is small relative to trend magnitude, and forecasting may be performed using the autoregression method.

If the item is not forecastable, MISER program 250 first checks whether "Supply Lead Time (SLT)<CRI for custsat % of the time" (step 725). SLT is the time required to manufacture or otherwise procure a specific item for delivery to a customer. On the other hand, CRI is the time period between placement of an order and the customer-specified delivery date. Custsat% is the user-specified level of customer satisfaction. For example, if the user specified the customer assurance level as 95%, then custsat% is 95%. If the time necessary to supply a given item is less than the interval of time the customer requires for delivery, there is no need to maintain an inventory of item on stock. In other words, if SLT<CRI, the item should be made to order.

Figure 8:
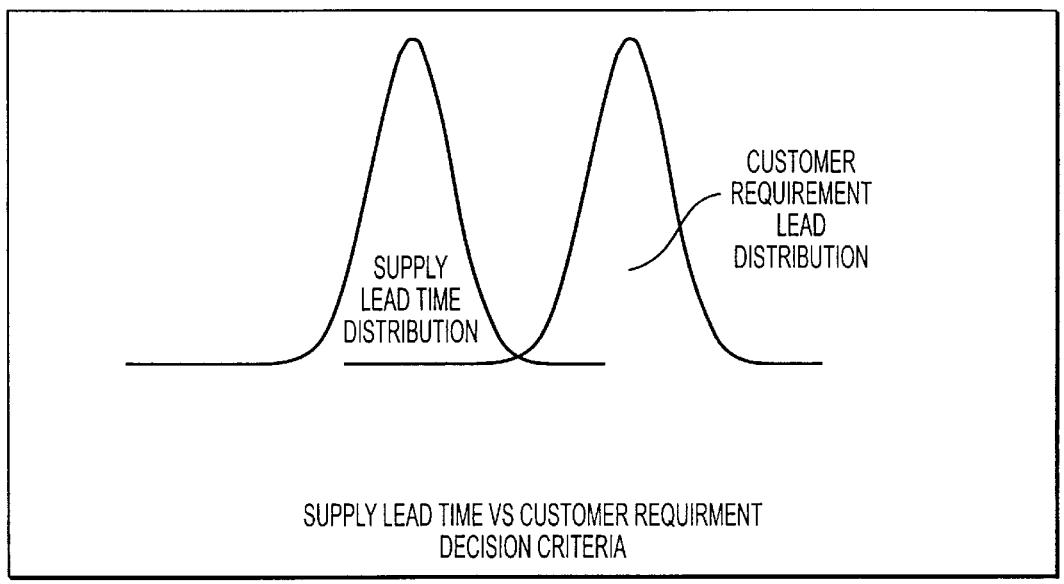
FIG. 8 is a graph showing the relationship between a supply lead time and a customer requirement interval.

Because SLT and CRI are random rather that absolute values, there is always some chance that the item will not be deliverable within the customer required interval. MISER program 250 weighs the probability of on-time delivery of each inventory item given its demand and supply distributions according to the graph shown in FIG. 8. MISER program 250 takes the weighed probability and ascertains whether it falls within a user-defined customer assurance level to ensure an on-time delivery of the item. For example, if a user-defined customer assurance level is 95%, the probability that the item will be late must be 5% or less.

To determine whether the probability is below the threshold, for example, below 5%, a solution Z is obtained by assuming the following:

1. Lead Time, LT, is a normal random variable with mean $\mu_{LT}$ and standard deviation $\sigma_{LT}$.
2. Customer Requirement Interval, CRI, is a normal random variable with mean $\mu_{CRI}$ and standard deviation $\sigma_{CRI}$.
3. CRI and LT are independent random variables.

Given these assumptions, the solution is:

$$Z \leq \frac{\mu_{LT} - \mu_{CRI}}{\sqrt{\sigma_{LT}^2 + \sigma_{CRI}^2}}$$

where Z is the standard normal distribution coefficient of the user-defined customer service target level.

If Z is less than the tolerable probability of a late delivery, in the above example 5%, then MISER program 250 assigns strategy #1 (Make-To-Order) to the inventory item. If not, MISER program 250 proceeds to the next node in decision tree 700.

Next, MISER program 250 checks whether the item has a history of lumpy, or highly variable, demands (step 730). MISER program 250 computes a standard coefficient of variation (COV), which is a ratio of standard deviation of demand per period to average demand per period. A COV greater than 1.0 indicates a non-forecastable demand. If the item has demands, then MISER program 250 assigns strategy #5 to the item. If not, the item is assigned strategy #3 (Warehouse Replenishment).

Returning to step 710, if Average Order Cost does not exceed costlimit, then MISER program 250 determines whether "Cost/Volume>maglimit" (step 735). Cost/Volume is the unit cost of an item divided by total demand. Maglimit is the limit on cost/volume ratio, whose numerical value is dependent on product portfolio characteristics. The numerical value assigned to maglimit is dependent on the product portfolio. In this step, the ratio of cost and volume per line is calculated and compared to the upper limit, maglimit.

Testing has shown that setting maglimit=1.0 has proven effective at identifying products that have exceptionally high cost to volume ratios. This node distinguishes line items that are expensive and have relatively low demand. Such items have significant potential for inflating inventory costs if mistakes are made in the procurement process.

If the ratio of cost and volume per line exceeds maglimit, MISER program 250 determines whether the SLT is highly variable (step 740). If so, MISER program 250 assigns strategy #5 to the item.

If SLT is not highly variable, then MISER program 250 ascertains whether the item is forecastable (step 745). Similar analysis is performed as described in connection with step 720. If the item is forecastable, MISER program 250 assigns strategy #6 to the item.

If the item is not forecastable, MISER program determines whether "SLT<CRI" (step 750). Similar analysis is performed as described in connection with step 725. If SLT<CRI, then MISER program 250 assigns strategy #1 to the item. If not, strategy #2 (Replenish-To-Order) is assigned.

Returning to step 735, if the ratio of cost and volume per line does not exceed maglimit, MISER program 250 determines whether "SLT<CRI" (step 755). Similar analysis is performed as described in connection with step 725.

If SLT<CRI, then MISER program 250 determines whether the item has a history of highly variable demands (step 760). Similar analysis is performed as described in connection with step 730. If the item does not have highly variable demands, the item is assigned strategy #4 (Fixed-Rate Supply).

If the item has highly variable demands, MISER program 250 ascertains whether the item is forecastable (step 765). Similar analysis is performed as described in connection with step 720. If the item is forecastable, MISER program 250 assigns strategy #6. Otherwise, it assigns strategy #1 to the item.

Returning to step 755, if SLT is not less than CRI, MISER program 250 determines whether the item has highly variable demands (step 770). Similar analysis is performed as described in connection with step 730. If the item does not have highly variable demands, the item is assigned strategy #3.

If the item has highly variable demands, MISER program 250 ascertains whether the item is forecastable (step 775). Similar analysis is performed as described in connection with step 720. If the item is forecastable, it is assigned strategy #6.

Otherwise, MISER program 250 determines whether "Number of Orders>ordlimit" (step 780). As explained above, ordlimit is an annual limit on the number of orders placed based on a percentile of an order-based stratification of the entire portfolio. If the number of orders exceeds this ordlimit, MISER program assigns strategy #5. Otherwise, it assigns strategy #2 to the item.

Once MISER program 250 determines the recommended optimal inventory management strategy for each portfolio item, it calculates additional values necessary to implement the recommended strategy. The following details the calculations performed to provide this information:

1. Make-To-Order

Reorder Point = 0
   Safety Stock = 0
   Kanban = 0
   Economic Order Quantity = 0
   Initial and Average Inventory Levels = 0

2. Replenish-To-Order (Kanban)

Reorder Point = 0
   Safety Stock = 0
   Economic Order Quantity = 0
   Kanban = K = $\mu_{demand}$ + k$\sigma_{demand}$
   $\mu_{demand}$ = average demand per period
   $\sigma_{demand}$ = standard deviation of demand per period
   L = lead-time
   k = multiplier corresponding to normal distribution function for designated percentile identified as desired service level
   Initial Inventory Level = Kanban Size Average Inventory Size = Kanban − D*L
D = average demand per period,
L = average lead-time.

3. Warehouse Replenishment (EOQ)

Kanban = 0
Reorder Point = ROP = DL
D = average demand per period,
L = average lead-time.

$$\text{Safety Stock} = SS = k\left(\sigma_{demand}\sqrt{L}\right)$$

k = multiplier corresponding to normal distribution
function for designated percentile identified as
desired service level
$\sigma_{demand}$ = standard deviation of demand per period
L = procurement lead time
Formula assumes approximate normal distribution for period
demand. For a desired 95% service level, k = 1.64.
Economic Order Quantity $$EOQ = \sqrt{\frac{2DS}{H}}$$

D = Total Demand for survey periods
S = Setup cost per order
H = Holding cost per unit. (unit cost * holding cost percentage)
Initial Inventory InitInv = EOQ + Safety Stock, if ROP < EOQ
InitInv = EOQ + Safety Stock + ROPi, if ROP > EOQ
Average Inventory = 0.5*EOQ + Safety Stock 4. Fixed-Rate Supply Reorder Point = 0
Safety Stock = 0
Kanban = 0
Economic Order Quantity = 0
Initial and Average Inventory Levels = 0

5. Multi-Input Expert Planning

Kanban = 0
Reorder Point = ROP = DL
D = average demand per period,
L = average lead-time.

$$\text{Safety Stock} = SS = k\left(\sigma_{demand}\sqrt{L}\right)$$

k = multiplier corresponding to normal distribution
function for designated percentile identified as
desired service level
$\sigma_{demand}$ = standard deviation of demand per period
L = procurement lead time
Formula assumes approximate normal distribution for period
demand. For a desired 95% service level, k = 1.64.
Economic Order Quantity $$EOQ = \sqrt{\frac{2DS}{H}}$$

Figure 9:
FIG. 9 is a sample output screen displaying the inventory strategy results.

D = Total Demand for survey periods
S = Setup cost per order
H = Holding cost per unit. (unit cost * holding cost percentage)
Initial Inventory InitInv = EOQ + Safety Stock, if ROP < EOQ
InitInv = EOQ + Safety Stock + ROPi, if ROP > EOQ
Average Inventory = 0.5*EOQ + Safety Stock 6. Forecast Optimal Reorder Point = 0
Kanban = 0
Economic Order Quantity = 0

$$\text{Safety Stock} = SS = k\left(\sigma_{demand}\sqrt{L}\right)$$

k = multiplier corresponding to normal distribution function for
designated percentile identified as desired service level
(Hard-coded to 3.0 (99.8% satisfaction) under forecast
optimal condition in order to insure adequate levels)
$\sigma_{demand}$ = standard deviation of demand per period
L = procurement lead time
Formula assumes approximate normal distribution for period
demand. For a desired 95% service level, k = 1.64.
Initial Inventory = Forecast + Safety Stock
Average Inventory = .5 * Forecast + Safety Stock After the evaluation process, MISER program 250 also displays a summary of the output results as shown in FIG. 9. The summary information includes, for example, the output file name, number of inventory items, number of weeks of historical demand data, average inventory cost, total inventory turns, and a strategy count for each of the six inventory strategies.

CONCLUSION

The system and method consistent with the present invention accommodates special characteristics and requirements of various types of inventory portfolios. It also combines multiple management strategies into a single inventory management system to provide an accurate and optimal inventory management tool. Additionally, it predicts future demands for inventories by first determining whether inventory items are forecastable.

It will be apparent to those skilled in the art that various modifications and variations can be made in the computer network of the present invention and in construction of this computer system without departing from the scope or spirit of the invention. Other embodiments of the invention will be apparent to those skilled in the art from consideration of the specification and practice of the invention disclosed herein. The specification and examples should be considered as exemplary only, with the true scope and spirit of the invention indicated by the following claims.

What is claimed is:

1. A method for providing an inventory management system for managing an inventory portfolio with a plurality of inventory management strategies in a data processing system comprising the steps of:

accessing in the data processing system a database containing inventory resources data corresponding to the inventory portfolio and an inventory item to be evaluated;

analyzing the inventory resources data of the inventory item with the inventory resources data of the inventory portfolio;

determining an appropriate one of the inventory management strategies for the inventory; and selecting an appropriate one of the inventory management strategies for the inventory item when it is determined which inventory management strategy for the inventory is applicable.

2. The method of claim 1 wherein the analyzing step includes the substeps of stratifying the inventory portfolio according to a predetermined attribute of the inventory portfolio, and comparing an attribute of the inventory item corresponding to the stratified attribute of the inventory portfolio.

3. The method of claim 2 wherein the stratifying step includes the substep of stratifying the inventory portfolio into a plurality of stratification groups each corresponding to a different one of the attribute.

4. The method of claim 3 further including the steps of determining predetermined thresholds for each one of the stratification groups, and wherein the selecting step further includes the substep of selecting the appropriate one of the inventory management strategies for the inventory item based on the determined thresholds.

5. The method of claim 1 further including the step of determining whether a future demand of the inventory item is forecastable based on the corresponding inventory resources data.

6. The method of claim 5 wherein the determining step includes the substeps of computing a frequency of demand of the inventory item according to the inventory resources data, and determining whether the demand frequency of the inventory item exceeds a predetermined threshold demand frequency.

7. The method of claim 5 wherein the determining step includes the substeps of computing a variability of demand of the inventory item according to the inventory resources data, and determining whether the demand variability of the inventory item exceeds a predetermined threshold demand variability.

8. The method of claim 1 further including the step of generating a management prescription for implementing the selected one of the inventory management strategies.

9. The method of claim 8 wherein the generating step includes the substep of determining a re-order point as the management prescription.

10. The method of claim 8 wherein the generating step includes the substep of determining a safety stock quantity as the management prescription.

11. The method of claim 8 wherein the generating step includes the substep of determining an economic order quantity as the management prescription.

12. The method of claim 1 wherein the stratifying step includes the substep of stratifying the inventory portfolio according to a cost per order of the inventory portfolio.

13. The method of claim 1 wherein the stratifying step includes the substep of stratifying the inventory portfolio according to a total volume of the inventory portfolio.

14. The method of claim 1 wherein the stratifying step includes the substep of stratifying the inventory portfolio according to an order frequency of the inventory portfolio.

15. The method of claim 1 further including the step of displaying the selected management strategy.

16. A method for providing an inventory management system in a data processing system comprising the steps of:

storing in a database located in the data processing system historical data corresponding to an inventory item;

computing a demand frequency of the inventory item from the historical data;

determining whether a future demand of the inventory item is forecastable based on the demand frequency;

determining an appropriate inventory management strategy for the inventory based on the determination of whether the future demand of the inventory item is forecastable; and selecting the appropriate inventory management strategy for the inventory item for the inventory item when it is determined which inventory management strategy for the inventory is applicable.

17. The method of claim 16 wherein the determining step further includes the substep of determining whether the computed demand frequency exceeds a predetermined threshold demand frequency.

18. The method of claim 16 further including the steps of computing a variability of demand of the inventory item from the historical data, and determining whether the demand variability of the inventory item exceeds a predetermined threshold demand variability.

19. A method performed by a data processing system for providing an inventory management system, comprising the steps of:

accessing in a database inventory resources data corresponding to an inventory portfolio;

accessing in the database inventory resources data corresponding to an inventory item to be evaluated;

comparing in the data processing system the inventory resources data of the inventory item to the resources data of the inventory portfolio;

selecting an appropriate inventory management strategy for the inventory item for the inventory item based on the result of the comparison; and determining a management prescription for the inventory item based on the selected management strategy.

20. The method of claim 19 wherein the determining step further includes the substep of determining a re-order point.

21. The method of claim 19 wherein the determining step further includes the substep of determining a safety stock quantity.

22. The method of claim 19 wherein the determining step further includes the substep of determining an economic order quantity.

23. An inventory management system for managing an inventory portfolio with a plurality of inventory management strategies comprising:

means for accessing a database containing inventory resources data corresponding to the inventory portfolio and an inventory item to be evaluated;

means for analyzing the inventory resources data of the inventory item with the inventory resources data of the inventory portfolio;

means for determining an appropriate one of the inventory management strategies for the inventory and;

means for selecting an appropriate one of the inventory management strategies for the inventory item when it is determined which inventory management strategy for the inventory is applicable.

24. The system of claim 23 wherein the analyzing means includes means for stratifying the inventory portfolio according to a predetermined attribute of the inventory portfolio, and means for comparing an attribute of the inventory item corresponding to the stratified attribute of the inventory portfolio.

25. The system of claim 24 wherein the stratifying means includes means for stratifying the inventory portfolio into a plurality of stratification groups each corresponding to a different one of the attribute.

26. The system of claim 25 further including means for determining predetermined thresholds for each one of the stratification groups, and wherein the selecting means further includes means for selecting the appropriate one of the inventory management strategies for the inventory item based on the determined thresholds.

27. The system of claim 23 further including means for determining whether a future demand of the inventory item is forecastable based on the corresponding inventory resources data.

28. The system of claim 27 wherein the determining means includes means for computing a frequency of demand of the inventory item according to the inventory resources data, and means for determining whether the demand frequency of the inventory item exceeds a predetermined threshold demand frequency.

29. The system of claim 27 wherein the determining means includes means for computing a variability of demand of the inventory item according to the inventory resources data, and means for determining whether the demand variability of the inventory item exceeds a predetermined threshold demand variability.

30. The system of claim 23 further including means for generating a management prescription for implementing the selected one of the inventory management strategies.

31. The system of claim 30 wherein the generating means includes means for determining a re-order point as the management prescription.

32. The system of claim 30 wherein the generating means includes means for determining a safety stock quantity as the management prescription.

33. The system of claim 30 wherein the generating means includes means for determining an economic order quantity as the management prescription.

34. The system of claim 23 wherein the stratifying means includes means for stratifying the inventory portfolio according to a cost per order of the inventory portfolio.

35. The system of claim 23 wherein the stratifying means includes means for stratifying the inventory portfolio according to a total volume of the inventory portfolio.

36. The system of claim 23 wherein the stratifying means includes means for stratifying the inventory portfolio according to an order frequency of the inventory portfolio.

37. The system of claim 23 further including means for displaying the selected management strategy.

38. An inventory management system comprising:

a memory containing a database that stores historical data corresponding to an inventory item;

means for computing a demand frequency of the inventory item from the historical data;

means for determining whether a future demand of the inventory item is forecastable based on the demand frequency;

means for determining an appropriate inventory management strategies for the inventory based on the determination of whether the future demand of the inventory item is forecastable; and means for selecting an appropriate inventory management strategy for the inventory item for the inventory item when it is determined which inventory management strategy for the inventory is applicable.

39. The system of claim 38 wherein the determining means includes means for determining whether the computed demand frequency exceeds a predetermined threshold demand frequency.

40. The system of claim 38 further including means for computing a variability of demand of the inventory item from the historical data, and means for determining whether the demand variability of the inventory item exceeds a predetermined threshold demand variability.

41. An inventory management system comprising:

means for accessing in a database inventory resources data corresponding to an inventory portfolio;

means for accessing in the database inventory resources data corresponding to an inventory item to be evaluated; and a processor configured to:

compare the inventory resources data of the inventory item to the resources data of the inventory portfolio;

select an appropriate inventory management strategy for the inventory item for the inventory item based on the result of the comparison; and determine a management prescription for the inventory item based on the selected management strategy.

42. The system of claim 41 wherein the determining means further includes means for determining a re-order point.

43. The system of claim 41 wherein the determining means further includes means for determining a safety stock quantity.

44. The system of claim 41 wherein the determining means further includes means for determining an economic order quantity.

* * * * *